July 26, 1955     J. RABINOW     2,713,927
MAGNETIC FLUID CLUTCH SHAFT SEAL
Filed Nov. 27, 1950     3 Sheets-Sheet 1
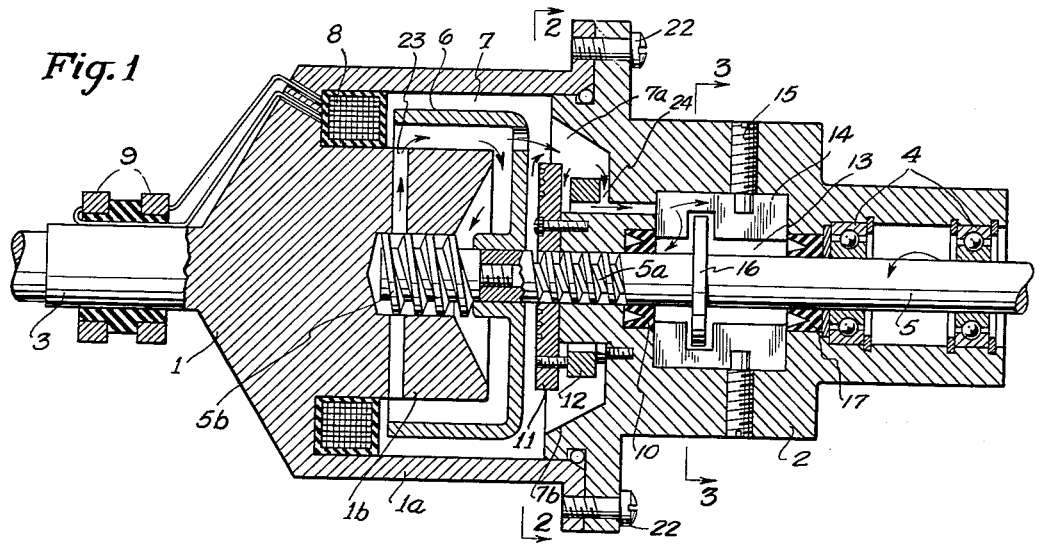
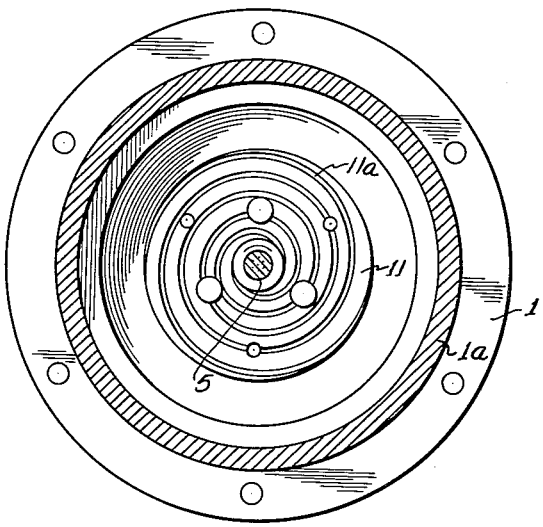
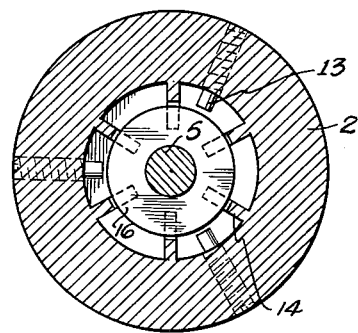
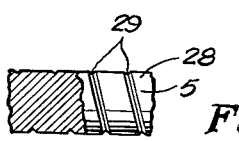
INVENTOR.
Jacob Rabinow July 26, 1955  J. RABINOW  2,713,927
MAGNETIC FLUID CLUTCH SHAFT SEAL
Filed Nov. 27, 1950  3 Sheets-Sheet 2

INVENTOR.
Jacob Rabinow
BY
*[signatures]*
ATTORNEYS

July 26, 1955  J. RABINOW  2,713,927
MAGNETIC FLUID CLUTCH SHAFT SEAL
Filed Nov. 27, 1950  3 Sheets-Sheet 3
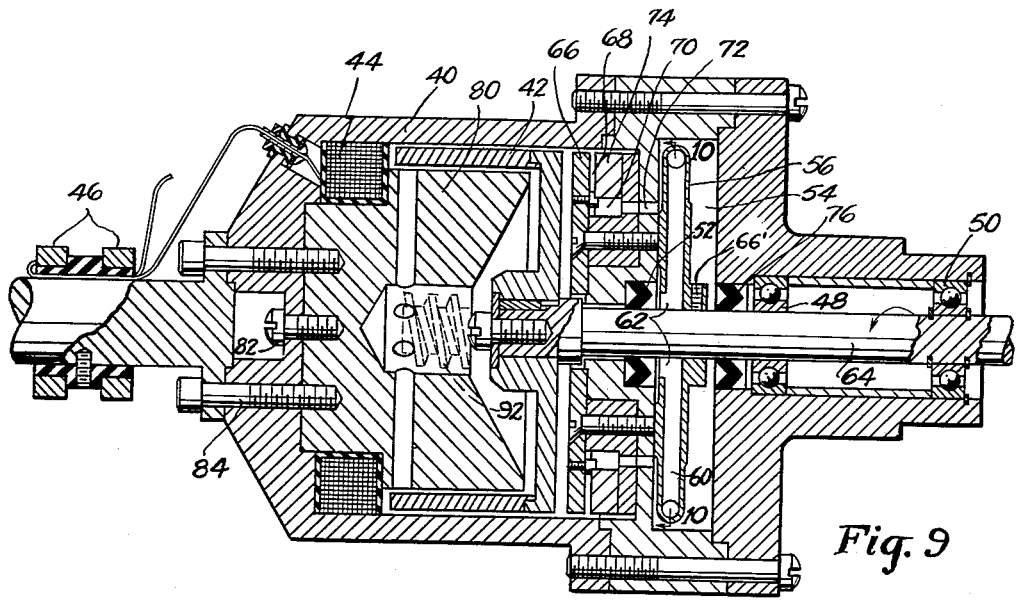
Fig. 9
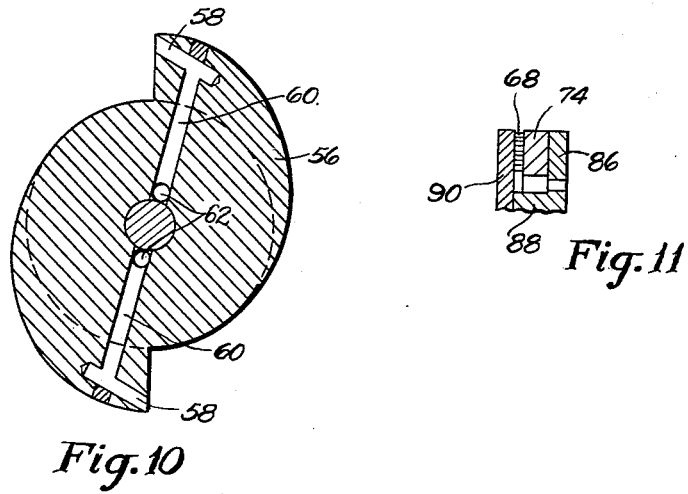
Fig. 10
Fig. 11
INVENTOR.
Jacob Rabinow
BY
*H. H. Helvestine*
*George Sipkin*
ATTORNEYS United States Patent Office 2,713,927
Patented July 26, 1955

2,713,927

MAGNETIC FLUID CLUTCH SHAFT SEAL

Jacob Rabinow, Takoma Park, Md., assignor to the United States of America as represented by the Secretary of the Navy Application November 27, 1950, Serial No. 197,817

21 Claims. (Cl. 192—21.5)

(Granted under Title 35, U. S. Code (1952), sec. 266)

This invention relates to shaft seals, particularly for magnetic fluid devices, and more especially for clutches.

In magnetic fluid clutches (using either permanent magnets or electromagnets), wherein a mixture of iron particles dispersed in oil is used, a certain amount of heat is generated by the desired slipping of the clutch, and such heat results in an expansion of the iron-oil mixture which is used as a magnetic fluid. In addition, since these clutches often are intentionally incompletely filled, there is expansion of the vapor content, and a good deal of splashing occurs. Such expansion pressure and splashing cause the mixture to work past the normal shaft seal and thence to the bearings, which may be damaged thereby, due to abrasive action of the iron particles. In addition to the bearing damage, a loss of liquid also occurs and is undesirable.

The primary object of the present invention is to generally improve shaft seals. A more particular object of the invention is to provide a seal which effectively prevents the magnetic particles from reaching the outer seal and the bearings and which at the same time prevents loss of liquid.

In accordance with one feature and object of the invention the fluid is permitted or caused to flow in limited quantity to a chamber located outside the seal but inside the bearing, and the chamber is provided with pump means to pump the fluid back through the seal. Thus the pump operates in opposition to leakage through the seal, and instead produces a flow in opposite direction.

In accordance with a further feature and object of the invention, appropriate filter means, preferably in the form of a labyrinth passage at least a part of which is magnetized, is employed to hold back the ferromagnetic particles, and to pass clear fluid alone.

A further object of the invention is to combine these features, the filter being employed to permit only clear fluid to reach the chamber outside the seal, and the pump being employed to force the clear fluid back through the seal in reverse direction.

Further objects of the invention are to additionally seal the chamber on its other side against passage of the clear fluid to the bearing; to provide additional magnetic means in the chamber to collect any slight amount of ferromagnetic particles which may reach the chamber; and to provide preferred forms of pump for the seal.

To accomplish the foregoing objects, and other more specific objects which will hereinafter appear, my invention resides in the shaft seal and magnetic fluid coupling elements, and their relation one to another, as are hereinafter more particularly described in the following specification. The specification is accompanied by drawings in which:

Fig. 1 is a longitudinal axial cross-section through a form of a magnetic fluid clutch utilizing a seal embodying features of my invention;

Fig. 1A illustrates a detail thereof;

Fig. 2 is a cross-section of Fig. 1, taken approximately on line 2—2;

Fig. 3 is a cross-section of Fig. 1, taken approximately on line 3—3;

Fig. 9 is a longitudinal cross-section taken on the axis of a preferred form of my invention;

Fig. 10 is a transverse cross-section through the pump element used in Fig. 9, taken approximately in the plane of the line 10—10 of Fig. 9; and Fig. 11 illustrates a detail thereof.

Figure 4:
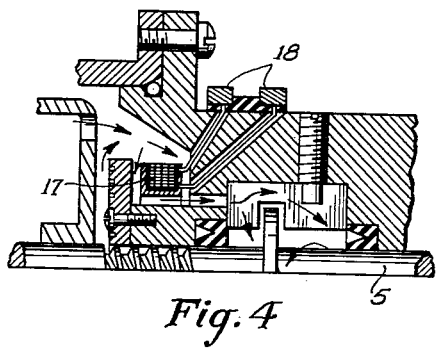
Fig. 4 is a fragmentary cross-section similar in part to Fig. 1, but showing a variant of my seal.

Illustrated in Fig. 1 is a preferred form of electromagnetic fluid clutch comprising two relatively rotatable members. A housing consisting of element 1 and element 2 bolted together forms one member of the clutch. The element 1 has an outer portion 1a and an inner portion 1b. A shaft 3 is connected to element 1 to transmit power thereto or therefrom. Bearings 4 are provided in element 2 to accommodate a second shaft 5, which has mounted on its end a cup-like member 6 which forms the other member of the clutch. The space 7 between element 6 and element 1 is filled with magnetic fluid, such fluid being usually a mixture of very finely divided iron particles in oil.

A coil of wire or field coil 8 is cemented or otherwise suitably affixed in an appropriate space in element 1, and has its leads brought to slip rings 9, so that the coil may be energized from an external source of electric power in varying degrees at the will of the operator. Since element 1 is made of a ferrous or other magnetic material, the passage of current through coil 8 causes a magnetic field to be set up between outer and inner parts 1a and 1b, and causes the magnetic fluid therebetween to become more or less solidified, causing friction between the fluid and the element 6. The latter may or may not be of ferrous or ferromagnetic material, although it preferably is in most cases.

One problem encountered in the operation of clutches of this type is that under operating conditions heat is generated, causing expansion of the fluid and vapor, and consequent creep of fluid through any seals provided and thus into the bearings. Splashing also contributes to this. The finely divided iron particles cause wear of the bearings and should therefore be prevented from reaching them. It is more permissible that oil be allowed to pass through the seals and into the bearings, so long as such oil does not carry iron particles. However, even the flow of clear oil should be minimized, as well as the "breathing" of air by the clutch. To achieve this end, a seal 10, which may be of any conventional type and which need not be of extreme excellence, is provided approximately as shown. In addition, portion 5a of shaft 5 is provided with threads such that rotation of the shaft will cause a flow in a direction away from bearings 4 and toward chamber 7. A disc 11 is provided to cause the fluid to be drawn outwardly from the shaft by its rotation. Relatively freely mounted and positioned approximately as shown, is a magnetic ring 12, which is magnetized transversely so that one of its poles is spaced a short distance from plate 11 and another of its poles a short distance from element 2. This acts as a magnetic filter to hold back the iron particles.

In addition, there is an auxiliary chamber 13 equipped with baffles 14 and magnetic screws 15. These baffles are cut out as shown to clear an oil slinger 16 attached to shaft 5. A second seal 17 is provided between the chamber 13 and bearings 4, in order to inhibit the passage of clear oil.

The operation of the device is as follows, assuming shaft 5 to be the driving shaft. When shaft 5 begins rotating, in the direction shown by the arrow at the right, the screw pump or impeller 5b secured to the end of shaft 5 causes a preliminary circulation of the iron-oil mixture to take place in chamber 7, as shown by the small arrows, until the mixture leaves the center of the clutch due to centrifugal action. As heat is generated, a portion of the mixture from chamber portion 7a will be forced past the magnet 12, and the magnetic material in the mixture will be attracted to the magnet, being thrown off by centrifugal force as the accumulation of magnetic material becomes too great for the forces involved to retain. The chamber portion 7a is so shaped that centrifugal force will urge the iron particles toward the chamber portion 7.

The oil which passes from chamber portion 7a to the auxiliary chamber 13 will be free of iron powder. Such stray iron particles as may enter this chamber accidentally are thrown outwardly by the slinger 16, but their rotational speed is retarded by the baffles 14, and the iron particles are attracted to the magnetized screws 15. These may be removed periodically for cleaning. Thus, the fluid which reaches the outer seal 17 is completely free of iron particles and if it passes through said seal will tend to lubricate rather than damage the bearings 4.

Fig. 2 illustrates a cross-section taken on the line 2—2 of Fig. 1. Plate 11 is preferably provided with spiral slots 11a, which are so directed relative to the direction of rotation of the shaft as to serve to urge the mixture outwardly.

Fig. 3 illustrates a cross-section of Fig. 1 taken on the line 3—3, shows the auxiliary chamber 13 and the approximate position of the stationary baffle plates 14, the magnetized screws 15, and the rotatable oil slinger 16.

Reverting to Fig. 1, the main outside or housing parts 1 and 2 are assembled with a suitable gasket therebetween by means of screws 22. The outer and inner parts 1a and 1b may be integral with part 1, it being understood that the part 1b is generally cylindrical, and that the absence of cross-hatching at 23 indicates a series of radial holes for the flow of magnetic fluid circulated by the screw pump 5b. The screw or pump impeller 5b serves primarily to circulate the magnetic fluid. It helps to more effectively distribute the heat generated by the clutch, and helps transfer it to the outside of the unit.

The other screw or pump impeller 5a acts as a part of the shaft seal. It tends to draw or force clear oil from the auxiliary chamber 13 back to the main clutch chamber. It opposes leakage which might otherwise occur from the clutch chamber through the seal toward the auxiliary chamber.

The passages indicated at 24 around the magnetic ring 12 are relatively constricted, and may be termed a labyrinth passage between the coupling and the auxiliary chamber 13. This labyrinth passage is equipped with a filter to hold back the iron particles and to permit only cleared or filtered fluid to reach the auxiliary chamber. The particular filter shown is a magnetic filter, the magnetic ring 12 forming much of the wall area of the labyrinth passage.

As iron particles build up on the ring they are thrown clear by centrifugal action resulting from rotation of the ring. When thrown clear they tend to remix with the magnetic fluid in the main coupling chamber, this action being improved by the shape of the chamber around the ring which, as here illustrated, has a frusto-conically shaped wall 7b, so that any iron particles thrown radially outward tend to move in axial direction back into the main body of magnetic fluid in the clutch.

In any event it will be seen that in essence the complete shaft seal includes an auxiliary chamber 13 between an ordinary shaft seal 10 and a shaft bearing 4, with a passage 24 leading to the auxiliary chamber, the said passage having a filter to hold back the magnetic particles from any of the magnetic fluid flowing to the chamber, so that the chamber receives substantially clear fluid. There is, however, a pump means, in this case the screw impeller 5a, to urge the clear fluid from the auxiliary chamber 13 back through the seal 10 in opposition to leakage which might otherwise occur in the opposite direction.

It will be understood that in showing the screw impeller 5a in Fig. 1 (and Figs. 4, 5 and 8 as well), the size or coarseness of the thread has been greatly exaggerated. The thread is preferably a very fine thread of large pitch which leaves most of the shaft surface intact. The nature of the thread will be better understood from the fragmentary showing in Fig. 1A of the drawing, in which the cylindrical surface 28 of the shaft 5 is left substantially intact, the thread groove 29 being a very fine groove of large pitch.

It will be understood that everything disclosed in respect to clutches is equally applicable to other devices, including brakes, a brake being merely a coupling in which one of the two relatively movable parts is held stationary. In practical form a brake would differ from the clutch shown in Fig. 1 in not requiring the use of the slip rings 9, the member 1 with its field coil 8 being held stationary.

Fig. 4 shows a variant of my oil seal, wherein the permanent magnet 12 of Fig. 1 is replaced by an electromagnet 17 with slip rings 18. Depending upon the composition of the mixture and other factors, it may be desirable at times to place a pulsating D. C. on the windings of electromagnet 17, or a smooth D. C., or an alternating current. With alternating current the magnet releases the iron particles during the zeros or current nodes, and so permits centrifugal force to throw them clear of the magnet. Thus the preferred action with alternating current requires continuous rotation of the shaft. With direct current excitation the electromagnet has a continuous steady flux the magnitude of which depends upon the intensity of the current used. A pulsating direct current, if of correct magnitude relative to the speed of rotation of the clutch when rotated, might be made to partake of some of the advantages of both alternating current and direct current excitation. The construction and operation of this form of my invention is otherwise as previously described.

Figure 5:
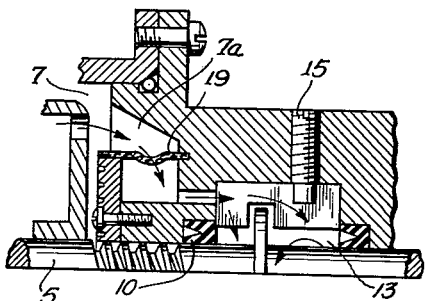
Fig. 5 is a similar fragmentary cross-section showing another variant of my seal.

Fig. 5 shows another variant of my oil seal, wherein a loose flexible diaphragm 19 is provided instead of a magnetic filter. This diaphragm will flex inwardly toward shaft 5 when the temperature within the chamber 7 rises, and will arrest the passage of iron particles, although it is permeable to the oil. In other words, the filter is a mechanical filter instead of a magnetic filter. Any stray iron particles which pass into the auxiliary chamber 13 will be picked up by the magnetic screws 15, as previously described. Again, it will be noted that centrifugal force will cause the iron particles collected on diaphragm 19 to be expelled outwardly, and that the chamber 7a is so shaped that centrifugal force will urge the re-entry of such iron particles into chamber 7.

Figure 6:
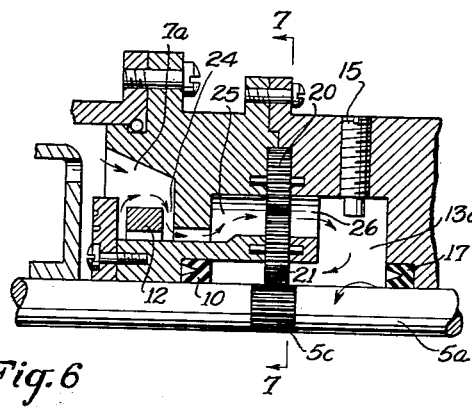
Fig. 6 is a fragmentary cross-section showing still another variant of my seal.
Figure 7:
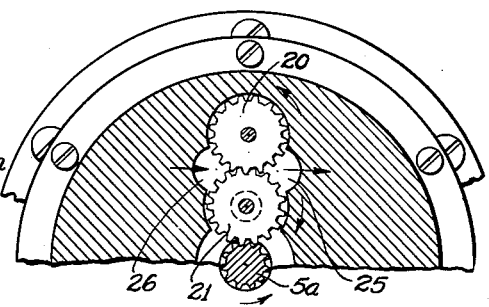
Fig. 7 is a transverse cross-section through the clutch shown in Fig. 6, taken approximately on the line 7—7.

Figs. 6 and 7 show another variant for use in clutches wherein a great deal of expansion is anticipated. Here the pump of the seal is a conventional gear pump, driven by a gear 5c on shaft 5a. The pump consists of gears 20 and 21. The action in auxiliary chamber 13a is much as previously described, including the collection of stray particles by magnetic screws 15.

The gear pump comprises an inlet passage 25 and an outlet passage 26, for the direction of rotation shown, it being understood that the mesh of the gears constitutes a barrier between the passages 25 and 26, and that the fluid is carried upward by gear 20 and downward by gear 21 and thence around to the outlet passage 26.

Now the inlet passage 25 extends in axial direction from the coupling chamber to the gears and then stops, as shown in Fig. 6, while the outlet passage 26 extends in axial direction from the auxiliary chamber 13a to the gears and then stops. In this respect the showing of the drawing in Fig. 6 is schematic and not at all a true representation. More specifically, the inlet passage 25 is really behind the plane of the section shown, while the outlet passage 26 is really in front of the plane of the section, instead of both lying in that plane (as indicated in Fig. 7 for purposes of clarity of illustration without unduly increasing the number of views needed in the drawing).

In respect to operation of the shaft seal shown in Figs. 6 and 7 it will be understood that as before, there is a main bearing for the shaft, not shown but located to the right of the secondary seal 17, and that there is a main seal 10 between the magnetic fluid device and the bearing. There is an auxiliary chamber 13a between the seal 10 and the bearing, and a somewhat constricted or labyrinth passage 24 between the magnetic fluid device and the auxiliary chamber, which passage permits flow of fluid to the chamber. Again there is a filter in the passage, here illustrated by the magnetic ring 12, which holds back the magnetic particles from any fluid flowing to the auxiliary chamber 13a, so that the latter receives clear fluid. Then there is a pump means, in this case the gear pump 20, 21, which pumps the clear fluid from the auxiliary chamber 13a through the seal 10 back to the coupling in opposition to leakage which might otherwise occur from the coupling through the seal toward the auxiliary chamber and main bearing.

Figure 8:
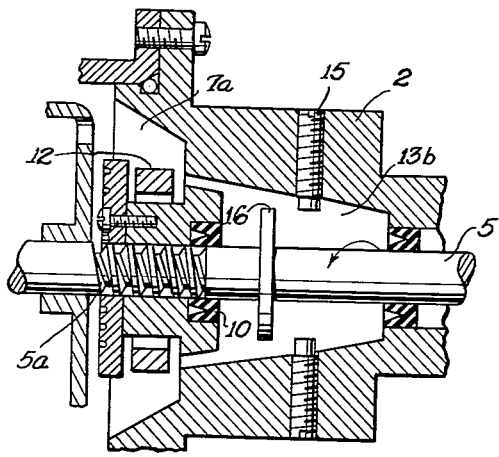
Fig. 8 is a fragmentary cross-section showing a further variant of my seal.

Fig. 8 shows another variant of my oil seal, wherein chamber 13b is so shaped that centrifugal force will cause the iron-oil mixture to be urged toward chamber 7a, the other actions in the chamber being similar to that described in connection with Fig. 1. To some extent therefore the action of the slinger 16 is opposed to the action of the pump 5a, but more effectively as to the iron than the oil. At the same time any escaped iron particles thrown outward which move to the right instead of the left are collected by the magnetic screws 15.

In most forms of the invention so far described the pump impeller is a screw on the shaft. This has the disadvantage of increasing wear at the seal. The modification shown in Figs. 6 and 7 avoids this by using a gear pump, but that complicates the mechanism and is inconvenient when working with a clutch of comparatively small diameter. It also increases the problem of proper balance of the clutch.

The modification next described in connection with Figs. 9 and 10 employs an entirely different form of pump which is far simpler than the gear pump and which avoids the disadvantage of a screw impeller on the shaft. The clutch arrangement is generally like that described in connection with Fig. 1 in comprising relatively rotatable ferromagnetic parts 40 and 42 with a magnetic fluid therebetween, and a field coil 44, the excitation of which is controlled externally through slip rings 46. There is also a main bearing 48, 50 between the relatively movable parts, and a main seal 52 between the bearing and the clutch. Here again there is an auxiliary chamber 54 between the seal 52 and the bearing 48, and a pump 56 for pumping fluid from the chamber through the seal 52 in opposition to leakage which might otherwise occur.

However, in the present case the pump is an improved pump using an impeller having a Hero engine shape as shown in Fig. 10. It has intake passages 58 communicating with radial passages 60, which in turn lead to axial passages 62. As will be seen in Fig. 9 the passages 62 lead directly to the shaft at seal 52 and thus pump fluid around the shaft through the seal back to the clutch. The impeller is secured to the shaft 64, as by means of set screw 66'.

Arrangements using a thread on the shaft as the pump (as in Figs. 1, 4, 5 and 8) may be employed at low or moderate temperature and pressure inside the clutch, but are not satisfactory at high temperatures and pressures. When the clutch is in operation the iron-oil mixture is centrifuged, and a clear space containing only air or oil vapor and decomposition vapor is left around the shaft of the clutch. Consequently a pump located on or near the shaft, as is the case with the screw impeller, has difficulty in pumping clear oil through the seal. The reversed Hero-engine-type of impeller shown in Figs. 9 and 10 has the obvious advantage of picking up oil in the outer circumference of the auxiliary chamber, and indeed in Fig. 9 it will be seen that the auxiliary chamber has been increased to a diameter equal to or even greater than the diameter of the clutch chamber. In this way a continuous circulation of oil is maintained through the shaft seal in reverse direction. Such an arrangement operates without failure under very severe test conditions.

The flow of fluid to the chamber 54 is through a labyrinth passage made up of a cylindrical part 66, a radial part 68, another cylindrical part 70, and axially directed holes 72. Some of the walls of this labyrinth passage are provided by a magnetic ring 74, preferably made of Alnico or other modern, highly magnetic alloy. Thus the magnetic particles in the fluid are held back by the ring 74, and only clear fluid reaches the chamber 54, and it is this clear fluid which is pumped back through the seal 52.

The magnetic filter shown in Fig. 9 has been found more efficient than that shown in Fig. 1, and the reason for this may be explained with reference to Fig. 11 of the drawing. The Alnico or other permanent magnetic ring as is well known in the art is magnetized axially as shown at 74. Instead of being a free ring, one face is secured to a part 86 in direct flux communication with parts 88 and 90, leaving a very short annular pole space or gap at 68. Thus the annular passage 68 constitutes the sole gap in an otherwise closed magnetic path, and the magnetic flux is concentrated in the gap and functions most effectively to hold back the iron particles from the fluid flowing through the passage, as it must to reach the auxiliary chamber.

As before, a second seal 76 (Fig. 9) may be provided between the chamber 54 and the bearing 48, thus inhibiting the flow of clear fluid to the bearing. Any slight leakage which may occur does no harm and acts simply as a lubricant for the bearing.

In Fig. 9 the clutch part 40 includes an inner portion 80, and this is preferably stepped to lock the field coil 44 in position. The inner and outer parts 40 and 80 are assembled by means of screws 82 and 84. The screw impeller 92 has been indicated in broken lines because it may be omitted, its using being optional, and in any case, as previously mentioned, this impeller forms a part of the clutch itself, rather than the shaft seal of the present invention.

It is believed that the construction and operation of my improved shaft seal, as well as the advantages thereof, particularly for use with magnetic fluid devices, will be apparent from the foregoing detailed description.

There is no loss of volatile fluid components due to evaporation. There is no breathing, so that the clutch is independent of the ambient atmosphere. Fluid polymerization can be delayed or prevented because of the controlled atmosphere within the clutch. Oxidation of iron inside the clutch can be delayed or prevented for the same reason. Also the unit can operate at higher temperatures than unsealed units. Because heat radiation from the clutch increases as the four power of the temperature, sealed units can dissipate much higher heat power for the same radiating surface. Moreover, a sealed clutch can be designed for operation in any position and for any specific duty cycle, and is therefore adaptable to general industrial use.

In the description it was assumed for simplicity that the righthand shaft (5, 5a or 64) is the driving shaft, but it should be understood that the lefthand shaft may be the driving shaft, in which case it should be assumed to be rotated in opposite direction. With the left shaft driving and rotated in opposite direction, all relative rotation of the parts is exactly the same as though the right shaft were driving and rotated in the direction shown on the present drawings, and therefore the screw pump action, the gear pump action, and the Hero impeller action would be the same as described above. It is not only possible, but in most cases would be more desirable, for the lefthand shaft to be used as the driving shaft, and it was merely for simplicity in describing the pump operation that the description first assumed the righthand shaft to be the driving shaft.

It should also be understood that it is not essential for the clutch parts to include the bearings shown. In certain installations the two shafts may be effectively supported in outside bearings, but the clutch parts should nevertheless be sealed to contain the fluid. In such case the invention would be the same in other respects, in using spaced seals on the shaft with an auxiliary chamber therebetween, together with a filter to filter the fluid reaching the auxiliary chamber, and a pump to urge the clear fluid from the auxiliary chamber through the inner seal in opposition to any attempted leakage along the shaft. Moreover, it may be mentioned that the invention is not limited to the use of a single auxiliary chamber with two seals, for obviously a greater number of seals and auxiliary chambers may be employed along the shaft. A pump and a flow passage may be used in each chamber, or a single pump in the innermost chamber, in which latter case one has merely improved the quality of the outer seal.

It will be apparent that while I have shown and described my invention in a number of forms, many changes may be made in the structures shown without departing from the scope of the invention as sought to be defined in the following claims.

The invention described herein may be manufactured and used by or for the Government of the United States of America for governmental purposes without the payment of any royalties thereon or therefor.

I claim:

1. A magnetic fluid device comprising relatively movable ferromagnetic parts with a magnetic fluid therebetween, said magnetic fluid containing magnetic particles and a carrier liquid, externally controllable means for magnetizing the magnetic fluid, axially spaced outer and inner seals between said relatively movable ferromagnetic parts, an auxiliary chamber between the seals, a passage between the relatively movable ferromagnetic parts and the auxiliary chamber for permitting flow of magnetic fluid toward the chamber, a filter in said passage for holding back the magnetic particles from fluid tending to flow to the chamber, whereby the chamber receives substantially clear carrier liquid, and pump means to urge clear carrier liquid from the chamber through the inner seal toward the relatively movable ferromagnetic parts in opposition to leakage of magnetic fluid which might otherwise occur from the relatively movable ferromagnetic parts through the inner seal toward the outer seal.

2. A magnetic fluid coupling comprising relatively rotatable ferromagnetic parts with a magnetic fluid therebetween, said magnetic fluid containing magnetic particles and a carrier liquid, externally controllable means for magnetixing the magnetic fluid, axially spaced outer and inner seals between said relatively rotatable ferromagnetic parts, an auxiliary chamber between the seals, a relatively constricted labyrinth passage between the ferromagnetic parts and the chamber for permitting flow or magnetic fluid toward the chamber, a permanent magnet ring forming a substantial part of said labyrinth passage for removing the magnetic particles from any magnetic fluid flowing to the chamber, whereby the chamber receives substantially clear carrier liquid, and pump means to urge carrier liquid from the chamber through the inner seal toward the ferromagnetic parts in opposition to leakage of magnetic fluid which might otherwise occur from the ferromagnetic parts through the inner seal toward the outer seal.

3. A magnetic fluid device as defined in claim 1, in which the pump means is a gear pump disposed between the ferromagnetic parts and the auxiliary chamber.

4. A magnetic fluid device as defined in claim 1, in which the pump means is an impeller of the Hero-engine-type used in reverse, said impeller rotating in the aforesaid auxiliary chamber.

5. A magnetic fluid device comprising relatively movable ferromagnetic parts with a magnetic fluid therebetween, said magnetic fluid containing magnetic particles and a carrier liquid, externally controllable means for magnetizing the magnetic fluid, a bearing between said relatively movable ferromagnetic parts, a seal between the ferromagnetic parts and the bearing, a chamber between the seal and the bearing, a passage between the ferromagnetic parts and the chamber for permitting flow of magnetic fluid toward the chamber, a filter in said passage for holding back the magnetic particles from any magnetic fluid flowing to the chamber whereby the chamber receives substantially clear carrier liquid, and pump means to urge clear carrier liquid from the chamber through the seal toward the ferromagnetic parts in opposition to leakage of magnetic fluid which might otherwise occur from the ferromagnetic parts through the seal toward the bearing.

6. A magnetic fluid device as defined in claim 5, in which the pump is a gear pump disposed between the ferromagnetic parts and the chamber.

7. A magnetic fluid device as defined in claim 5, in which the pump is an impeller of the Hero-engine-type used in reverse, said impeller rotating in the chamber.

8. A magnetic fluid device as defined in claim 5, in which there are one or more readily removable magnets projecting into the chamber to collect any magnetic particles which may escape into the chamber.

9. A magnetic fluid device as defined in claim 5, in which there is a second seal between the chamber and the bearing in addition to the aforesaid first seal between the chamber and the ferromagnetic parts, and in which there are one or more readily removable magnets in the chamber to collect any magnetic particles which may escape into the chamber.

10. A device as defined in claim 5, in which the pump is a screw on one of the ferromagnetic parts.

11. A magnetic fluid coupling comprising relatively rotatable ferromagnetic parts with a magnetic fluid therebetween, said magnetic fluid containing magnetic particles and a carrier liquid, externally controllable means for magnetizing the fluid, a bearing between said relatively rotatable ferromagnetic parts, a seal between the ferromagnetic parts and the bearing, a chamber between the seal and the bearing, a relatively constricted labyrinth passage between the ferromagnetic parts and the chamber for permitting flow of magnetic fluid toward the chamber, a permanent magnet ring forming a substantial part of said labyrinth passage for holding back the magnetic particles from any magnetic fluid flowing to the chamber, whereby the chamber receives substantially clear carrier liquid, and pump means to urge clear carrier liquid from the chamber through the seal toward the ferromagnetic parts in opposition to leakage of magnetic fluid which might otherwise occur from the ferromagnetic parts through the seal toward the bearing.

12. A device as defined in claim 11, in which the pump means is a screw on one of the ferromagnetic parts.

13. A magnetic fluid device as defined in claim 11, in which the pump means is a gear pump disposed between the ferromagnetic parts and the chamber, and in which the pump is so located as to receive carrier liquid despite centrifugal force.

14. A magnetic fluid coupling as defined in claim 11, in which there is a second seal between the chamber and the bearing in addition to the aforesaid first seal between the chamber and the ferromagnetic parts, and in which there are a plurality of readily removable magnetized screws projecting into the chamber to collect any magnetic particles which travel through the labyrinth passage.

15. A magnetic fluid device as defined in claim 11, in which the pump is an impeller of the Hero-engine-type used in reverse, said impeller rotating in the aforesaid chamber, and in which the pump is so located as to receive carrier liquid despite centrifugal force.

16. A magnetic fluid device comprising, first and second relatively rotatable parts, the first of said relatively rotatable parts forming a housing about the second of said relatively rotatable parts and having an elongated hollow hub portion, the second of said parts having an extension protruding through the elongated hub portion of the first member, one of said relatively rotatable parts having a ferromagnetic portion in proximity to a ferromagnetic portion of the other of said relatively rotatable parts, a magnetic fluid containing magnetic particles and a carrier liquid disposed in the region of the ferromagnetic portions of the relatively rotatable parts, means for magnetizing said magnetic fluid in the region of the ferromagnetic portions of the relatively rotatable parts, first and second seals cooperative with the hollow hub portion of the first of said relatively rotatable parts and the extension of the second of said relatively rotatable parts to form a chamber wherein the first seal is disposed between the second seal and the housing portion of the first of said relatively rotatable parts, a passage bypassing the first seal for permitting flow of magnetic fluid toward the chamber, a filter in said passage for holding back the magnetic particles from any magnetic fluid flowing to the chamber, whereby the chamber receives substantially clear carrier liquid, and pump means to urge clear carrier liquid from the chamber through the first seal in opposition to leakage of magnetic fluid past the first seal which might otherwise occur.

17. A magnetic fluid device comprising, first and second relatively rotatable parts, the first of said relatively rotatable parts forming a housing about the second of said relatively rotatable parts and having an elongated hollow hub portion, the second of said parts having an extension protruding through the elongated hub portion of the first member, one of said relatively rotatable parts having a ferromagnetic portion in proximity to a ferromagnetic portion of the other of said relatively rotatable parts, a magnetic fluid containing magnetic particles and a carrier liquid disposed in the region of the ferromagnetic portions of the relatively rotatable parts, means for magnetizing said magnetic fluid in the region of the ferromagnetic portions of the relatively rotatable parts, first and second seals cooperative with the hollow hub portion of the first of said relatively rotatable parts and the extension of the second of said relatively rotatable parts to form a chamber wherein the first seal is disposed between the second seal and the housing portion of the first of said relatively rotatable parts, a passage bypassing the first seal for permitting flow of magnetic fluid toward the chamber, a magnetic filter in said passage for holding back the magnetic particles from any magnetic fluid flowing to the chamber, whereby the chamber receives substantially clear carrier liquid, and pump means to urge clear carrier liquid from the chamber through the first seal in opposition to leakage of magnetic fluid past the first seal which might otherwise occur.

18. A magnetic fluid coupling comprising relatively rotatable ferromagnetic parts with a magnetic fluid therebetween, said magnetic fluid containing magnetic particles and a carrier liquid, externally controllable means for magnetizing the fluid, a bearing supporting one of said relatively moveable parts in coaxial relationship to another of said relatively rotatable parts, a first and a second seal between said ferromagnetic parts and said bearing, magnetic filter means between said ferromagnetic parts and said first seal for separating the magnetic particles from magnetic fluid flowing from said ferromagnetic parts to said first seal, an auxiliary chamber separating said first and second seals for collecting carrier liquid flowing through said magnetic filter to said second seal, and pump means between said ferromagnetic parts and said bearing to force carrier liquid from said auxiliary chamber to said ferromagnetic parts.

19. A magnetic fluid coupling comprising, cooperating relatively rotatable ferromagnetic parts with an enclosed space therebetween containing a magnetic fluid, said magnetic fluid containing magnetic particles and a carrier liquid, controllable means for magnetizing the magnetic fluid, a bearing for supporting one of said relatively rotatable parts, a seal between said ferromagnetic parts and the bearing, a partition at the seal separating said enclosed space into a main chamber and an auxiliary chamber, a labyrinth passage in said partition radially spaced from said seal for allowing a limited flow of magnetic fluid from said main chamber to said auxiliary chamber, a magnetic particle filter means in said labyrinth passage for holding back magnetic particles and allowing only carrier liquid into said auxiliary chamber, a pump located in said chamber to force a circulation of carrier fluid from said auxiliary chamber through said seal into said main chamber.

20. In a shaft sealing device for a magnetic fluid coupling having two relatively rotatable members in which the first member forms a housing substantially enclosing the second member and the second member having a shaft extending through the housing with a bearing at the intersection of the housing and the shaft, an outer seal between said housing and said shaft adjacent to said bearing, a partition within said housing spaced inwardly from said outer seal to form an auxiliary chamber, an inner seal between said partition and said shaft, said partition having apertures radially spaced from said inner seal for allowing a circulation of carrier fluid from said housing to said auxiliary chamber, magnetic particle filter means located near said apertures to hold back magnetic particles from entering said auxiliary chamber, and a pump within said auxiliary chamber to force the carrier liquid through said inner seal, whereby magnetic particles are kept from the vicinity of said seal.

21. A fluid coupling comprising two relatively rotatable parts, the first of said parts having a housing substantially enclosing the second part, and forming a chamber between said first and second parts, a shaft integral with said second part extending through said housing, a magnetic fluid comprising a carrier liquid and magnetic particles in said chamber, an inner and an outer shaft seal between said first part and said shaft, said seals being axially spaced on said shaft, a diametric partition member at said inner seal containing axial holes radially spaced from said shaft, said diametric partition separating said chamber into a main chamber and an auxiliary chamber, a magnetic particle filter ring located near the axial holes in said diametric partition to prevent magnetic particles from entering said auxiliary chamber, pump means located in said auxiliary chamber to urge clear carrier liquid from auxiliary chamber through the inner seal to the main chamber, whereby the magnetic particles are prevented from contacting said seal.

(References on following page)

References Cited in the file of this patent

UNITED STATES PATENTS

| | | |
|---|---|---|
| 2,014,859 | Mitchell, Jr. | Sept. 17, 1935 |
| 2,020,002 | Schweich | Nov. 5, 1935 |
| 2,418,620 | Brumazin | Apr. 8, 1947 |
| 2,519,449 | Findley | Aug. 22, 1950 |
| 2,525,571 | Winther | Oct. 10, 1950 |
| 2,587,077 | Winther | Feb. 26, 1952 |

OTHER REFERENCES

Bureau of Standards Technical Report 1213, National Bureau of Standards, Washington, D. C., March 30, 1948.

Magnetic Fluid Clutch—Transactions of AIEE, December 13, 1948.